2,752,544
WARD-LEONARD MOTOR CONTROL SYSTEMS FOR REEL MOTORS

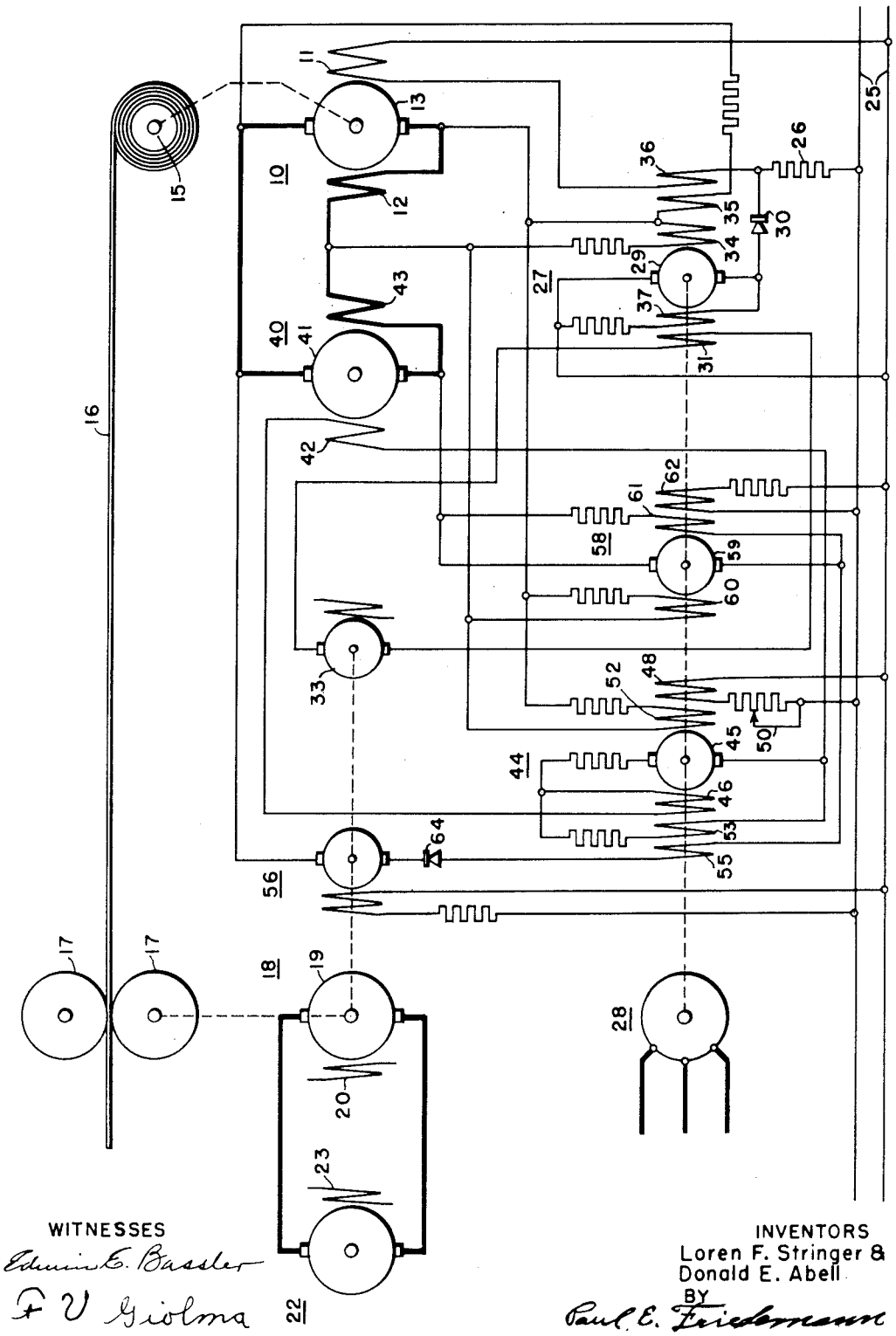

Loren F. Stringer, Pittsburgh, Pa., and Donald E. Abell, Buffalo, N. Y., assignors to Westinghouse Electric Corporation, East Pittsburgh, Pa., a corporation of Pennsylvania Application December 16, 1953, Serial No. 398,489

8 Claims. (Cl. 318—6)

Our invention relates generally to motor control systems, and has reference, in particular, to speed limit control systems for reel motors.

Generally stated, it is an object of our invention to provide in a novel manner for limiting the speed of a current regulated reel motor.

More specifically, it is an object of our invention to regulate as directly as possible the speed of a normally current regulated reel motor so as to provide the maximum stability of operation.

It is also an object of our invention to provide for applying directly to an excitation winding on a current regulator, voltages responsive to the speed of a mill and of a reel motor handling a strip of material from the mill, and which is being regulated by said regulator.

Another object of our invention is to provide for connecting a mill pilot generator directly in circuit with a control winding of a current regulator for a reel motor in opposition with a voltage representative of the speed of the motor, for limiting the speed thereof under predetermined conditions.

Yet, another object of our invention is to provide a speed limiting control for a current regulator operating on a reel motor, so that the regulator will be highly stable in operation.

Other objects will, in part, be obvious and will, in part, be explained hereinafter.

In practicing our invention in accordance with one of its embodiments, a current regulating generator for a reel motor is provided with an additional winding which is connected in series with a mill pilot generator and an IR drop generator across the armature of the reel motor generator, so as to be energized in accordance with a difference between the speeds of the mill and the reel motor. A rectifier blocks the voltage from the pilot generator, and a bias winding on the IR drop generator provides a threshold voltage so that the additional winding on the regulator is energized only when the speed of the reel exceeds the speed of the mill by a predetermined amount, to thus limit the speed of the reel motor.

For a more complete understanding of the nature and scope of our invention, reference may be made to the following detailed description which may be read in connection with the accompanying drawing in which the single figure is a diagrammatic view of a reel drive embodying the invention in one of its forms.

Referring to the drawing, the reference numeral 10 denotes a reel motor having a main field winding 11, a commutating field winding 12, and an armature 13 connected in driving relation with a reel 15 for winding a strip of material 16 which is proceeding from a mill stand represented by the rolls 17. A motor 18 having an armature 19 is connected in driving relation with the rolls 17. The field winding 20 of the motor 18 is supplied with electrical energy from a suitable source, while the armature is connected to a mill generator 22 having a field winding 23 connected to a source of reference voltage which is adjustable for varying the speed of the mill.

The field winding 11 of the reel motor is connected to a suitable source of excitation represented by the conductors 25 through a resistor 26 for supplying a minimum value of field excitation to limit the speed of the motor to a maximum safe value. The principal excitation of the field winding 11 is provided by a counter electromotive force regulating generator 27 driven by a motor 28 and having an armature 29 connected across the field winding in circuit with a rectifier 30 for permitting only increase in the excitation of the field winding above its minimum value. The regulating generator 27 is provided with a pattern field winding 31 energized in accordance with the speed of the mill being, for example, connected to a pilot generator 33 driven by the mill. Current and voltage windings 34 and 35 are provided on this regulating generator to give a measure of the motor counter electromotive force, these windings being connected in opposed relation to the pattern field winding 31. A self-energizing field winding 36 is connected in series with the main field winding 11 and an anti-hunt field winding 37 is connected in shunt with the armature 29.

The armature 13 of the reel motor is supplied with electrical energy from a generator 40 having an armature 41 connected in series circuit with the armature 13, a main field winding 42 and a commutating field winding 43. The main field winding 42 is normally energized by a current regulating generator 44 driven by the motor 28. The field winding 42 is connected across the armature 45 of the current regulating generator in series with a self-energizing field winding 46. A pattern field winding 48 is energized from the conductors 25 through an adjustable rheostat 50 for determining the value of current. A current control winding 52 connected across the commutating field winding 12 of the reel motor opposes the pattern field winding 48. A shunt anti-hunt field winding 53 is connected across the armature 45 and an additional excitation winding 55 is provided.

In order to modify the normal current regulating operation of the regulator 44, the additional excitation winding 55 is supplied with a voltage proportional to the speed of the mill either from the reference source of the generator field winding 23 or from a pilot generator 56, and has applied thereto in opposition to said voltage, a voltage responsive to the speed of the motor for causing the current regulator 44 to act as a speed regulator under predetermined conditions, and to improve the stability of operation. The additional excitation windings 55 are therefore also connected across the armature of the generator 40 to introduce a voltage measure of the motor speed in opposition to that of the pilot generator. The motor voltage is compensated for IR drop by means of an IR drop generator 58 having an armature 59 connected in series with the excitation winding 55 and a pilot generator 56 so as to give a true measure of motor counter E. M. F. or speed. An IR drop field winding 60 is provided on the generator 58 connected across the compensating field winding 12 of the reel motor to produce a voltage in opposition to that of the pilot generator 56. A shunt field winding 61 is provided which is differentially connected so as to reduce the residual voltage of the generator 58 and its effective internal impedance. A bias field winding 62 is also provided, being connected to the conductors 25 to establish a threshold voltage through which the speed limit generator effect will not operate. A rectifier 64 is connected in series with the pilot generator 56, IR drop generator 58 and excitation winding 55 to block the voltage from the pilot generator and the effect of the bias winding 62.

In normal operation, the regulating generator 27 will regulate the excitation of the main field winding 11 of the reel motor 10 to maintain a substantially constant value of motor counter electromotive force as determined by the balance of the effects of the current and voltage windings 34 and 35 against the effect of the pattern field winding 31. This regulating effect permits reduction in the speed of the reel motor 10 as the diameter of the coil of the strip 16 on the reel 15 increases during winding. At the same time, the current regulator 44 will normally operate to regulate the voltage of the generator 40 to maintain a substantially constant value of armature current so long as the strip 16 is being wound on the reel 15. The excitation effects of the current field winding 52 balance out against the effects of the pattern field winding 48 to regulate for the predetermined value of current.

During a threading operation or when the strip breaks, no such balancing force, as the torque exerted by the strip, is available, and the current regulator 44 would normally attempt to increase the reel at a constant rate. The counter electromotive force regulating generator 27 thereupon reduces the motor field in an effort to regulate the counter electromotive force. In order to prevent the existence of such an undesirable condition, it is necessary to balance the magnetomotive force of the reference or pattern winding by some other means than armature current feedback.

When the speed of the reel motor increase relative to the speed of the mill, the voltage of the generator 40 is increasing in a direction to overcome the voltage of the pilot generator 56. When it exceeds the voltage of the pilot generator by an amount determined by the bias winding 62 of the IR drop generator, the excitation winding 55 will be energized in a direction to reduce the output voltage of the generator 40 so as to no longer attempt to regulate for the predetermined value of current. The current regulator 44 becomes in effect a speed regulator under these conditions, and an excessive speed of the reel motor is prevented.

According to our invention, the external resistance in the additional excitation or speed limit field winding is minimized, and maximum use is made of the available space in the regulating generator for this winding. Thus, the required speed limit excitation is provided with a minimum of difference in speed between the strip and the reel. Since the speed limit field winding is connected directly in circuit with the counter electromotive force and pilot generator voltages, no additional time delay is introduced into the system, and consequently, the stability of the system is improved, so that the maximum speed limit regulator gain available can be used without fear of instability. By connecting the speed limit excitation circuit across the generator armature instead of across the armature of the reel motor, the IR drops of the generator and motor commutating field windings, as well as the corresponding drop in the conductors connecting the armatures, will be compensated for by the IR drop generator 58. This means that the generator 58 is compensating for a greater IR drop value, and since the inherent time delay of the generator 58 is applied to this greater value before it is introduced into the speed limit excitation circuit, the stability of the system is further improved. By utilizing the features of our invention, satisfactory speed limit can be obtained in a very simple system that is inherently stable and easy to adjust. Existing systems can easily be modified to incorporate the closer speed matching made available by the features of our invention. Reel drives embodying the features of the invention have shown very gratifying results with great improvement in speed matching with a high degree of stability.

Since certain changes may be made in the above-described construction, and different embodiments of the invention may be made without departing from the spirit and scope thereof, it is intended that all the matter contained in the above description and shown in the accompanying drawing shall be considered as illustrative and not in a limiting sense.

We claim as our invention:

1. The combination with a reel motor connected in driving relation with a reel for winding a strip of material and having a field winding and an armature, of regulating means for regulating excitation of the field winding to maintain a substantially constant value of motor counter electromotive force, additional regulating means having a plurality of excitation windings including windings having excitation responsive to the armature current and a fixed reference, and circuit means for applying to another of said windings voltages responsive to the speed of the motor and the speed of the strip in opposed relation.

2. The combination with a reel motor having an armature disposed to be connected in driving relation with a reel for handling a strip of material passing through a work device, of means including a regulator having a plurality of excitation windings including windings energized from a source of reference voltage and in accordance with the armature current connected to effect energization of the armature, and circuit means including a blocking rectifier for applying directly to another of said plurality of windings voltages responsive to the speeds of the work device and the reel motor in opposed relation.

3. In combination, a reel motor having a field winding and an armature disposed to be connected in driving relation with a reel for handling a strip of material, means including a regulator for effecting energization of the field winding above a predetermined minimum value to maintain a substantially constant value of counterelectromotive force, means including a regulator normally having excitation responsive to the armature current for effecting energization of the armature to maintain a predetermined value of armature current, and a circuit for applying directly to said current regulator additional excitation responsive to the speed of the strip and the counter electromotive force of the motor, said circuit including a unidirectional current device blocking the excitation responsive to the strip speed.

4. In a reel drive, a reel motor for connection to a reel for winding a strip of material proceeding from a work device, said motor having an armature and a field winding, regulating means for effecting energization of the field winding to maintain a substantially constant value of motor counterelectromotive force, generating means for supplying electrical energy to the armature, a regulator normally having excitation responsive to the armature current for regulating the output of the generating means to maintain a substantially constant value of armature current, a circuit for directly applying excitation to the regulator responsive to the speed of the work device and the speed of the motor in opposed relation, and a rectifier in said circuit for blocking the excitation responsive to the speed of the motor.

5. Regulating apparatus for a reel motor disposed to be connected in driving relation with a reel for winding a strip of material proceeding from a work device and having an armature and a field winding comprising, means including a regulator responsive to the counterelectromotive force of the motor for effecting energization of the field winding, a generator for supplying electrical energy to the armature, a regulator normally having excitation responsive to the armature current for regulating the output of the generator for maintaining a substantially constant value of armature current, and a circuit for applying excitation directly to the regulator responsive to the speed of the work device and the counterelectromotive force of the motor in opposition, said circuit including a rectifier for blocking the excitation responsive to the speed of the work device.

6. A reel drive comprising, a reel motor having an armature and a field winding, a counterelectromotive force regulator for regulating the excitation of the field winding above a predetermined minimum value, a generator having an armature for supplying electrical energy to the motor armature, a current regulator having a plurality of excitation windings including windings energized in opposed senses by a reference voltage and a voltage responsive to the motor armature current for normally maintaining a substantially constant value of motor armature current, a circuit connecting another of said excitation windings in shunt with the generator armature, means for introducing in said circuit a voltage responsive to the speed of a strip of material wound on the reel, and a rectifier in said circuit blocking said voltage.

7. In a reel drive, a motor having a field winding and an armature connected in driving relation with a reel for winding a strip of material from a rolling mill, means including a counterelectromotive force regulator for regulating excitation of the field winding above a predetermined minimum value, a generator having a field winding and an armature connected in circuit with the motor armature, a current regulator having a plurality of excitation windings including windings connected for energization from a reference source and in accordance with the armature current for normally regulating excitation of the generator field winding for a substantially constant value of armature current, a circuit connecting another of said excitation windings in shunt with the generator armature, means for introducing in said circuit a voltage to compensate for the IR drop of the motor armature circuit, means for introducing another voltage in said circuit responsive to the mill speed and in opposition to the aforesaid voltages, and a rectifier in said circuit blocking said mill speed responsive voltage.

8. A reel drive comprising, a reel motor having a field winding and an armature connected in driving relation with a reel for winding a strip of material from a rolling mill, means including a counterelectromotive force regulator for regulating the excitation of the field winding above a predetermined minimum value, a generator having a field winding and having an armature connected in series with the motor armature, a current regulator connected to effect energization of the generator field winding, said current regulator having excitation windings energized from a reference source and in accordance with the armature current, an additional excitation winding on said current regulator, a pilot generator for producing a voltage proportional to mill speed, a rectifier, an IR drop compensating generator having an excitation winding energized in accordance with the armature current and another winding energized from a source of bias voltage in opposition, and a circuit connecting the pilot generator, rectifier and IR drop generator in series with the additional winding in shunt with the generator armature with the pilot generator opposing the voltage of the generator and the IR drop compensation voltage, and the rectifier blocking the pilot generator voltage.

References Cited in the file of this patent
UNITED STATES PATENTS 2,629,845   Pabst _____ Feb. 24, 1953